A. F. COBB.
Fire Alarm.
No. 30,613.  Patented Nov. 13, 1860.
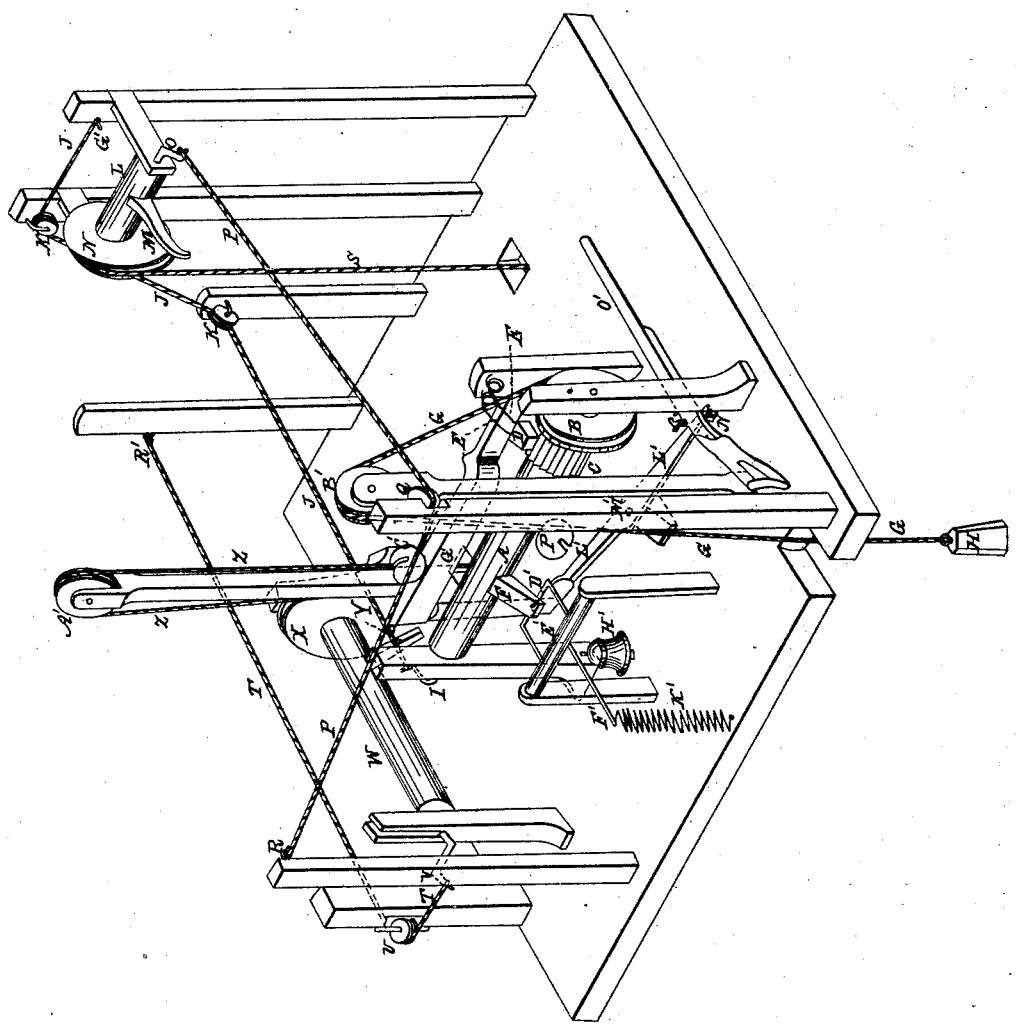
Witnesses:
Inventor:

UNITED STATES PATENT OFFICE.

A. F. COBB, OF CHAPEL HILL, MISSOURI.

FIRE-ALARM.

Specification of Letters Patent No. 30,613, dated November 13, 1860.

*To all whom it may concern:*

Be it known that I, A. F. COBB, of Chapel Hill, in the county of Lafayette and State of Missouri, have invented a new and useful Improvement in Fire-Alarms; and I do hereby declare that the following is a full, clear, and exact description of the same, reference being had to the accompanying drawings, forming a part of this specification, in which the drawings represent a perspective view of the apparatus.

The nature of my invention consists in the arrangement of a crank shaft, alarm bell, rattle, lever, gun and cord, in combination with independent crank shafts, dogs and cords leading to various parts of a building, for the purposes hereinafter described.

To enable others, skilled in the art, to make and use my invention, I will proceed to describe its construction and operation.

The alarm apparatus proper consists of a shaft A, (arranged in fixed bearings) provided with a dog F, a crank I, at one end, and a ratchet wheel C, and pulley B, at the other end. This shaft when let off (in a manner hereinafter to be described) so as to revolve in obedience to the tendency of weight H, operates the different alarm devices in the following manner. The dog F, first strikes the arm D', of a shaft E', so as to sound the alarm bell H', hung to the opposite arm F', of shaft E'. The spiral spring K', fastened to one end of arm F', keeps the bell in motion for some time after the arm D', has been struck. The dog F, then strikes one end of lever L', pivoted at M', whereby the other end of said lever is caused to operate the trigger N', and discharge the gun O'. The dog F, finally strikes the lever G', to which a bell C', is attached so as to sound the latter. While the shaft A, revolves the bell P', attached to the shaft A, will be kept sounding, and the block D, held down against the ratchet wheel C, by means of springs E, E, will produce a continuous rattling noise. The cord G, of weight H, passes over a guide pulley B', and is wound several times around and the end fastened to the pulley B, of shaft A, so that the noise of the bells and rattle will be kept up until the cord G, has been completely unwound from the pulley B.

The alarm apparatus is fixed in position ready to be let off, by means of a cord J. A loop at one end of the cord J, is hung to the pin of crank I, and the cord passes over guide pulleys K, K, to any suitable part of the building, a loop at the other end of the cord being hung to a pin Q'. Near Q', there is a shaft L, in fixed bearings, provided with a dog M, pulley N, and a weighted cord S, one end of which latter is wound around and fastened to pulley N. Another cord P, is fastened at one end to a pin R, passes over guide pulley Q, and is hung at its other end to a crank O, at the end of shaft L. A fire arising in any part of the building through which the cords P, J, pass will burn off said cord. On burning cord P, the crank O, will be freed and the shaft L, will revolve in obedience to the tendency of the weighted cord S; the dog M, revolving together with shaft L, will detach the end of cord J, from pin Q'; the crank I, will thus be set free, and thereby the alarm apparatus will be let off in the manner already described. On burning the cord J, the crank I, will also be set free and the alarm be sounded. Another shaft W, is arranged with a dog Y, opposite the end of cord J, near crank I, and with a crank V, at one end and a pulley X, at the other end. This pulley is provided with a weighted cord Z, in the same manner as the other pulleys B, N. A cord T, passes from another part of the buiding R', over a guide pulley U, and is fastened at its other end to crank V. A fire arising in any part of the building through which the cord T, passes, the cord will be burned off and thereby the crank V, will be set free. The shaft W, following the tendency of weighted cord Z, will revolve and the dog Y, will strike the end of cord J, and slip it off the crank I, so as to set the latter free and sound the alarm in the manner already described. Thus it will be seen that by leading cords T, J, P, in all the parts of a building likely to be exposed to fire, the alarm will be sounded as soon as a fire arrives in any of those parts of a building. The apparatus may also be used as a burglar detector by attaching one end of a cord to crank I, and the other end to the door of the room, so that the opening of the door will set free the crank I, and thus start the alarm apparatus.

What I claim as my invention and desire to secure by Letters Patent, is—

The arrangement of a crank shaft A, alarm bell H', rattle C, D, lever L', gun O', and cord J, in combination with independent crank shafts L, W, dogs M, Y, and cords P, T, leading to various parts of a building, substantially as and for the purposes set forth.

A. F. COBB.

Witnesses:
G. M. JACQUES,
GEO. M. MONTJOY.